(No Model.)
I. N. FICKES.
FRUIT GATHERER'S STAGING.
No. 558,166. Patented Apr. 14, 1896.
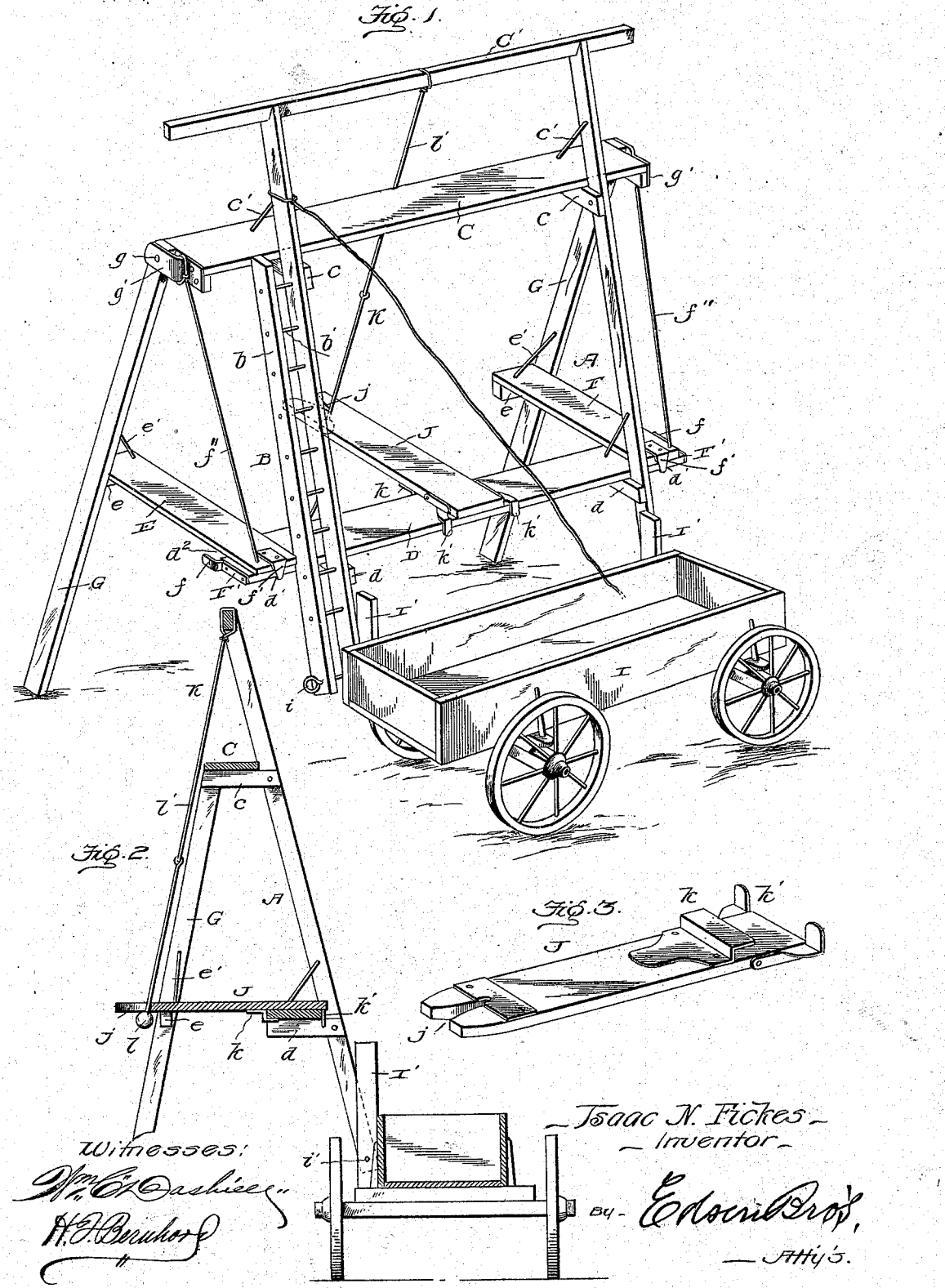

UNITED STATES PATENT OFFICE.

ISAAC NEWTON FICKES, OF HOLLAND, KANSAS.

FRUIT-GATHERER'S STAGING.

SPECIFICATION forming part of Letters Patent No. 558,166, dated April 14, 1896.

Application filed January 25, 1896. Serial No. 576,802. (No model.)

*To all whom it may concern:*

Be it known that I, ISAAC NEWTON FICKES, a citizen of the United States, residing at Holland, in the county of Dickinson and State of Kansas, have invented certain new and useful Improvements in Fruit-Gatherers' Staging; and I do hereby declare the following to be a full, clear, and exact description of the invention, such as will enable others skilled in the art to which it appertains to make and use the same.

My invention relates to a staging for gathering fruit from trees; and the object that I have in view is to provide a simple contrivance which can be placed to enable operators to pick the fruit with safety to themselves from the outside as well as among the branches at the middle part of the tree.

A further object of the invention is to provide a staging which can be folded compactly against the side of a wagon when the staging is to be moved around to the other side of the tree after the fruit has been picked from one side thereof and to so construct and arrange the various parts that they will not become displaced while the staging is occupied by the pickers, thus contributing to the safety of the persons engaged in picking the fruit.

With these ends in view and such others as pertain to a contrivance of this character my invention consists in the novel combination of devices and in the construction and arrangement of parts which will be hereinafter fully described and claimed.

To enable others to understand my invention, I have illustrated the preferred embodiment thereof in the accompanying drawings, forming a part of this specification, and in which—

Figure 1 is a perspective view of my staging for gathering fruit. Fig. 2 is a vertical transverse sectional view through the central platform. Fig. 3 is a perspective view of the central platform.

Like letters of reference denote corresponding parts in all the figures of the drawings.

A designates one of the uprights, and B is another upright, which is made in the form of a ladder by combining therewith the rail $b$ and the rungs $b'$, the parts B $b$ $b'$ being all united or secured together in a suitable way. The two uprights A B are provided near their upper ends with the fixed bars $c$ $c$, on which is secured the top longitudinal platform C, which is braced by means of the stay-rods $c'$, attached to the platform C and the uprights A B. The upper ends of the uprights A B are extended above the platform C, and to said upper ends of the uprights is fastened the hand-rail C', by which the occupant of the top platform C can steady himself when engaged in picking fruit from the top branches of a tree.

D indicates a bottom longitudinal platform which is fastened to the uprights A B at a suitable height above the ground and below the platform C, said platform D being also fastened to the rails $d$ $d$, which are securely attached to the uprights A B. The lower platform D has notches $d'$ $d'$ cut in the edge thereof next to and close up to the uprights A B for the purpose of receiving suitable retainers or pendent lips $f'$ on the movable right-angled platforms E F. To the end edges of the lower fixed platform are secured the metallic plates F', and the outer corners of the platform D are notched or recessed, as at $d^2$, these notches being situated between the free bent ends $f$ of the plates F' and the end edges at the outer corner of the platform D for the purpose of receiving the legs G G when the staging is folded.

The upper ends of the legs G G are pivotally attached, as at $g$, to the ends of the upper platform C by being fitted between the end edges of said platform and the bent ends of metallic plates $g'$, which are suitably fastened to the ends of said platform C. When the staging is adjusted for use, the legs G G are thrown out the proper distance to rest upon the ground and sustain the upper platform C, and through it the entire staging; but when the staging is to be moved the staging is tilted over toward the wagon, to which it is pivotally attached, and the pivoted legs are turned inward to rest in the notches $d^2$ of the lower platform D and to be confined in place by the plates F'.

The uprights A B of the staging have their lower ends pivotally attached to the wagon I by means of the pivotal rods $i$ $i'$ and the standards I'. These standards are rigidly fastened in a suitable way to the bed or running-gear of a vehicle of any suitable description, and the pivotal rods $i\ i'$ are passed through the standards I' and the lower ends of the uprights A B.

I provide three movable platforms in my improved staging, two of which are indicated in the drawings by the letters E F; but the third platform J is centrally arranged between the platforms E F and with relation to the longitudinal platforms C D. The end platforms E F are attached to and form an integral part of the structure of the staging, and when the latter is adjusted for use these end platforms E F serve to steady the legs G and the entire structure. The legs G have the inwardly-extending bars $e$, on which are secured the outer ends of the platforms E F, which are braced by the stay-rods $e'$. The platforms E F rest at their inner ends upon the lower platform D, and said inner ends of the platforms E F have the retainers or pendent angular lips $f'$, which are adapted to fit in the notches $d'$, so that the retainers prevent the platforms E F from slipping out of position on the platform D when the staging is adjusted for use. The inner free ends of these platforms E F are stayed by means of the cords, ropes, or braces $f''$, each of which is attached to the upper platform C and to the free inner end of one of the platforms E or F.

The central platform J is removable from the staging, and it is designed to be held in place at one end by being fitted or clamped to the platform D, and its other end is sustained by the cord or hanger-rod K. This central platform J is designed to be thrust into the branches at the middle part of the tree to enable the operator to pick fruit from the tree at points between the end platforms E F. As shown by Figs. 2 and 3, this central platform is provided at one end with a longitudinal tapering notch $j$, and near the other end of the platform J is a fixed transverse angular clamp $k$ and the pivoted clamps $k'\ k'$. The fixed clamp $k$ is fastened to the lower side of the platform J in position to fit around the front edge of the platform J, while the other clamps $k'$ are pivoted to the side edges of the platform J, and they are so formed that they can be fitted around the rear edge of the platform D, whereby the clamps $k\ k'$ operate to hold the inner end of the platform J securely in position on the platform D.

The hanger K is a rod provided with a head or weight $l$ at its lower end and with a cord or other flexible connection $l'$ at its upper end, which cord $l'$ is fastened to the platform C or the hand-rail C' at the upper end of the staging.

This being the construction of my staging, the operation may be described as follows: To adjust the staging for use, the vehicle I is drawn alongside of the tree, the legs G G are thrown out from the vehicle, and the staging is adjusted or tilted away from the vehicle until the platforms C D are close up to the tree. The legs G having been properly adjusted, the platforms E F rest upon the platform D, with the retainers or pendent angular lips $f'$ fitting in the notches $d'$. The platform J is now thrust into the branches of the tree, with its inner end resting on the platform D and confined in place by the clamps $k\ k'$, and the hanger K is adjusted to enter the notch in the outer end $j$ to sustain said outer end of the platform J in place. The staging is so proportioned that the operators can pick all the fruit from one half or side of the tree, and the platforms C, D, E, F, and J are so arranged that the operators can have access to all parts of the tree on the side against which the staging is placed, thus enabling all the fruit at the top, middle, bottom, and sides of the tree to be easily and quickly picked by persons standing on the platforms. After fruit has been picked off one side of the tree the vehicle is drawn around to the other side of the tree and the operation of picking off the fruit is repeated on that side of the tree. When the vehicle is to be moved from one side of the tree to the other or from one tree to another tree, the staging can be folded up against the vehicle by detaching the platform J, lifting up the platforms E F from the platform D, tilting the staging over against the vehicle, and folding the legs G into the notched ends $d^2$ of the platform D.

It will be noted that the staging can be easily adjusted, both folded and unfolded, by simply lifting up and replacing the platforms E F J and adjusting the legs.

Among other advantages my improved staging possesses the following: It is self-supporting and will not injure the weakest or tenderest tree. One setting covers as much space as could be secured by four settings of a ladder, and all the fruit can be gathered within the space covered by the staging, whereas by gathering by ladders some fruit is liable to be left on the tree or knocked off by poles. It affords a solid level footing for the operator, thereby saving his strength and contributing to the safety, ease, and comfort of the operator. The work is divided systematically and the fruit is brought conveniently to the gatherer. There is no necessity for the operator to pass up and down the ladders to empty the fruit until entirely through the operation of picking. The staging being attached to a wagon, it is not necessary to carry the fruit at a distance from the tree in order to store the fruit in a place of safety. The fruit can be pulled from a tree, avoiding the breaking of the branches. The hands of the operator are free to be used in gathering the fruit, thus enabling more fruit to be gathered within a given time. There is no necessity for going over finished work; and the structure can be transported from one tree to the other by horse-power, saving the operator from the labor of carrying heavy ladders.

Having thus fully described my invention, what I claim as new, and desire to secure by Letters Patent, is—

1. A portable staging comprising the uprights carrying one or more primary platforms, the pivoted legs, and auxiliary platforms supported by said legs and the primary platform, substantially as and for the purposes described.

2. A portable staging comprising suitable uprights, one or more primary platforms carried by said uprights, the pivoted legs, and an auxiliary platform at substantially right angles to the primary platform, substantially as and for the purposes described.

3. A portable staging comprising suitable uprights, a primary platform carried thereby, pivoted legs, and auxiliary platforms supported by the legs and having retainers to hold the same in position on the primary platform, substantially as and for the purposes described.

4. A portable staging comprising suitable uprights, a primary notched platform carried by said uprights, the pivoted legs, the auxiliary end platforms attached to the legs and adapted to rest on the notched platform, retainers fastened to the auxiliary platforms and fitted to the notched platform, and stays fastened to the auxiliary platforms, substantially as described.

5. A portable staging having the uprights, the legs, the primary platforms C, D, fastened to the uprights, the hand-rail fastened to the uprights, and auxiliary platforms, substantially as described.

6. The combination with a portable staging and a primary platform, of an auxiliary platform provided with clamps to hold one end in position on the primary platform, and suspending devices for the free end of the auxiliary platform, substantially as described.

7. The combination with a portable staging and a primary platform therefor, of the auxiliary notched platform, a fixed clamp on the auxiliary platform to engage one edge of the primary platform, adjustable clamps carried by the auxiliary platform in position to engage the other edge of the primary platform, and a headed hanger to fit in the notched end of the auxiliary platform, substantially as described.

In testimony whereof I affix my signature in presence of two witnesses.

ISAAC NEWTON FICKES.

Witnesses:
E. A. BARTELS,
L. L. BUCK.